(12) United States Patent
Watkins

(10) Patent No.: US 7,109,599 B2
(45) Date of Patent: Sep. 19, 2006

(54) OMNI-DIRECTIONAL WIND TURBINE ELECTRIC GENERATION SYSTEM

(76) Inventor: Philip G. Watkins, 28620 Mount Vancouver Ct., Rancho Palos Verdes, CA (US) 90275

(*) Notice: Subject to any disclaimer, the term of this patent is extended or adjusted under 35 U.S.C. 154(b) by 0 days.

(21) Appl. No.: 10/839,629

(22) Filed: May 5, 2004

(65) Prior Publication Data

US 2005/0248160 A1   Nov. 10, 2005

(51) Int. Cl.
F03D 3/00 (2006.01)

(52) U.S. Cl. ...................................................... 290/55

(58) Field of Classification Search ................... 290/44, 290/55; 310/268; 415/4.4
See application file for complete search history.

(56) References Cited

U.S. PATENT DOCUMENTS

| | | | | | |
|---|---|---|---|---|---|
| 3,320,454 | A | * | 5/1967 | Kober | 310/268 |
| 4,291,235 | A | * | 9/1981 | Bergey et al. | 290/55 |
| 4,318,019 | A | * | 3/1982 | Teasley et al. | 310/156.35 |
| 4,609,827 | A | * | 9/1986 | Nepple | 290/44 |
| 4,692,631 | A | * | 9/1987 | Dahl | 290/55 |
| 4,720,640 | A | * | 1/1988 | Anderson et al. | 290/43 |
| 5,126,584 | A | * | 6/1992 | Ouellet | 290/55 |
| 5,315,159 | A | * | 5/1994 | Gribnau | 290/55 |
| 5,380,149 | A | * | 1/1995 | Valsamidis | 415/2.1 |
| 5,632,599 | A | * | 5/1997 | Townsend | 416/42 |
| 6,015,258 | A | * | 1/2000 | Taylor | 415/4.4 |
| 6,177,735 | B1 | * | 1/2001 | Chapman et al. | 290/44 |
| 6,465,899 | B1 | * | 10/2002 | Roberts | 290/44 |
| 6,740,989 | B1 | * | 5/2004 | Rowe | 290/55 |

FOREIGN PATENT DOCUMENTS

RU   2064082 C1 * 7/1996

OTHER PUBLICATIONS

Statement of Applicant Accompanying an Information Disclosure.

* cited by examiner

*Primary Examiner*—Joseph Waks
(74) *Attorney, Agent, or Firm*—Donald D. Mon

(57) ABSTRACT

An omni-directional wind turbine electric generation system including a wind rotor carrying wind responsive vanes which on one surface exert an aerodynamic lifting force and on the other a blocking force both of which exert a torque in the same rotational sense, and an electric generator directly connected to said wind rotor and coaxial therewith, without transmission means between them.

2 Claims, 3 Drawing Sheets

OMNI-DIRECTIONAL WIND TURBINE ELECTRIC GENERATION SYSTEM

FIELD OF THE INVENTION

An electrical generation system driven by an omni-directional wind turbine, the system including a generator concentric with the wind turbine.

BACKGROUND OF THE INVENTION

Generation of electricity derived from structural response to the wind stream is a well-written story. The most familiar example is the windmill—a wind-driven propeller pointed into the wind by a trailing vane. This is the best-known representative of a class of rotary airfoils rotating around a horizontal axis. Among its many disadvantages are the need to keep it pointed into the wind, to provide for gearing, braking, and feathering controls to transfer the torque to an off-axis generator, and to keep the rotational speeds within acceptable limits.

Attempts have been made to provide for omni-directional response to the wind, that is, the ability to be driven without directional adjustment no matter what the direction of the wind is. With such a device, it is unnecessary to-point it into the wind because its axis of rotation is vertical.

The major problem with vertical axis rotors is that the wind blows on both sides of the axis of rotation, so that something must be done on a net basis to the baffles or airfoils on one side to resist the wind, and on the other side to pass the wind. Otherwise the rotor does not rotate because the force reaction is the same or nearly the same on both sides of the axis. Classical devices for this purpose include feathering of the foils or vanes on one side and supporting them on the other side.

This requires mechanism for the purpose, and generates considerable noise. Also the structure is not balanced, because it supports a much larger lateral load on one side than on the other.

The above problems were solved in an abandoned project a number of years ago. A number of wind turbines which included many of the features of this invention showed considerable promise, but were abandoned to the elements when the economic and environmental disadvantages of the systems were learned. For many years the advantages of this wind turbine would have been attainable if the rotor utilized in it and in this invention could successfully have been incorporated into in an acceptable total electrical generation system. The potentials of this wind turbine were neither appreciated, nor were the problems solved, so its potential benefits have remained unaccomplished.

Just as with a horizontal axis windmill, a conventional vertical axis wind turbine has heretofore required a gear box to transfer torque from the wind turbine's rotor turbine to the rotor of an electrical generator. While this appears to be a commonplace thing, these gear boxes are expensive, noisy, need maintenance, have speed limitations, and constitute a slow-speed drag which raises the lowest wind speed to which the system can respond and thereby forfeits the energy content of slow wind speed.

In addition to these disadvantages, gear boxes constitute a restraint on maximum speeds. An overspeed can lead to swift destruction of the mechanical system. To prevent this, either the wind responsive rotor has been at least partially disabled, or a braking system has been provided to limit its speed. A braking system conventionally feeds some of the generated power into a braking force. This seriously reduces the range of wind speeds from which energy can be extracted, and forfeits much energy that should be obtainable from high wind speeds.

It is an object of this invention to provide an elegantly simple wind turbine having an upright central axis, which turbine drives an electrical generator directly without intervening gearing or other transmission, and without the need to divert any of the wind-driven energy into velocity control over the turbine rotor itself. Then the wind turbine rotor can extract energy from a wind stream at any wind speed.

Further, it is an object of this invention to provide a rotationally stable and quiet system, without the vibration and noise which make windmill type systems poor neighbors. In fact, this system is so quiet that it can be installed in one's yard, where even a small system can readily generate useful amounts of electricity and at very slow wind speeds.

Yet another disadvantage of known tower-supported systems is their tendency to be toppled by high velocity winds. Very heavy supports are conventionally used to resist this tendency. This invention, by its use of a properly proportioned wind rotor utilizes the spatial rigidity of a rotating object to resist toppling movement, and enables an importantly stable installation. This stability is further enhanced by a lower profile dictated both by reduction of the height of a confronting aspect ratio, and by proportions that provide optimum spatial rigidity.

BRIEF DESCRIPTION OF THE INVENTION

An electrical generation system according to this invention utilizes an omni-directional wind turbine characterized by a wind rotor with vanes disposed in a circular pattern on and around a ring that is rotatable around a nominally vertical axis. The vanes extend parallel to the axis.

The vanes have the characteristic that when one of its faces is aerodynamically aligned with an incoming air stream (the wind), that vane generates a "lifting" force which exerts a torque on the ring. The opposite face of the vane is shaped to react with the air stream from the same direction to produce a resistive force that applies a torque to the ring in the same rotational sense when rotated by the ring to present its other side to the wind. The same vane thereby presents its sides alternately to the wind as the rotor turns and it moves from one side of the stream to the other. Thus, identical vanes, some on each side of the stream exert a torque in the same rotational sense to rotate the ring, rather than in opposite rotational senses to stall the ring. The wind turbine rotor is mounted to a rotary shaft that is supported on fixed structure. The shaft rotates around the central axis.

According to this invention, an electrical generator is mounted to the structure below the wind turbine's rotor. It includes a generator stator fixed to the structure and a generator rotor fixed to the rotary shaft. This generator can be a "pancake" or a "ring" type having a fixed stator and a rotating rotor. They are characterized by being concentric with the axis of the wind turbine rotor.

In a permanent magnet type generator, the generator rotor carries magnets, preferably permanent magnets, and the stator carries windings. The rotor rotates relative to the stator (both being circular in plan view). The windings are connected to circuitry, perhaps as a delta-type circuit. The magnets may lie in planes normal to the axis in a pancake type generator, or on a cylindrical surface coaxial with it in a ring-type generator.

Excited-field generators may be used if desired, instead of permanent magnet fields. Then the magnetic field to be cut is electrically generated. These are common generator concepts. In every event, the entire system is rotationally stable and symmetrical. There are no gears or directional controls. The generator is directly driven by the wind turbine's rotor.

The above and other features of this invention will be fully understood from the following detailed description and the accompanying drawings, in which:

DETAILED DESCRIPTION OF THE INVENTION

Figure 1:
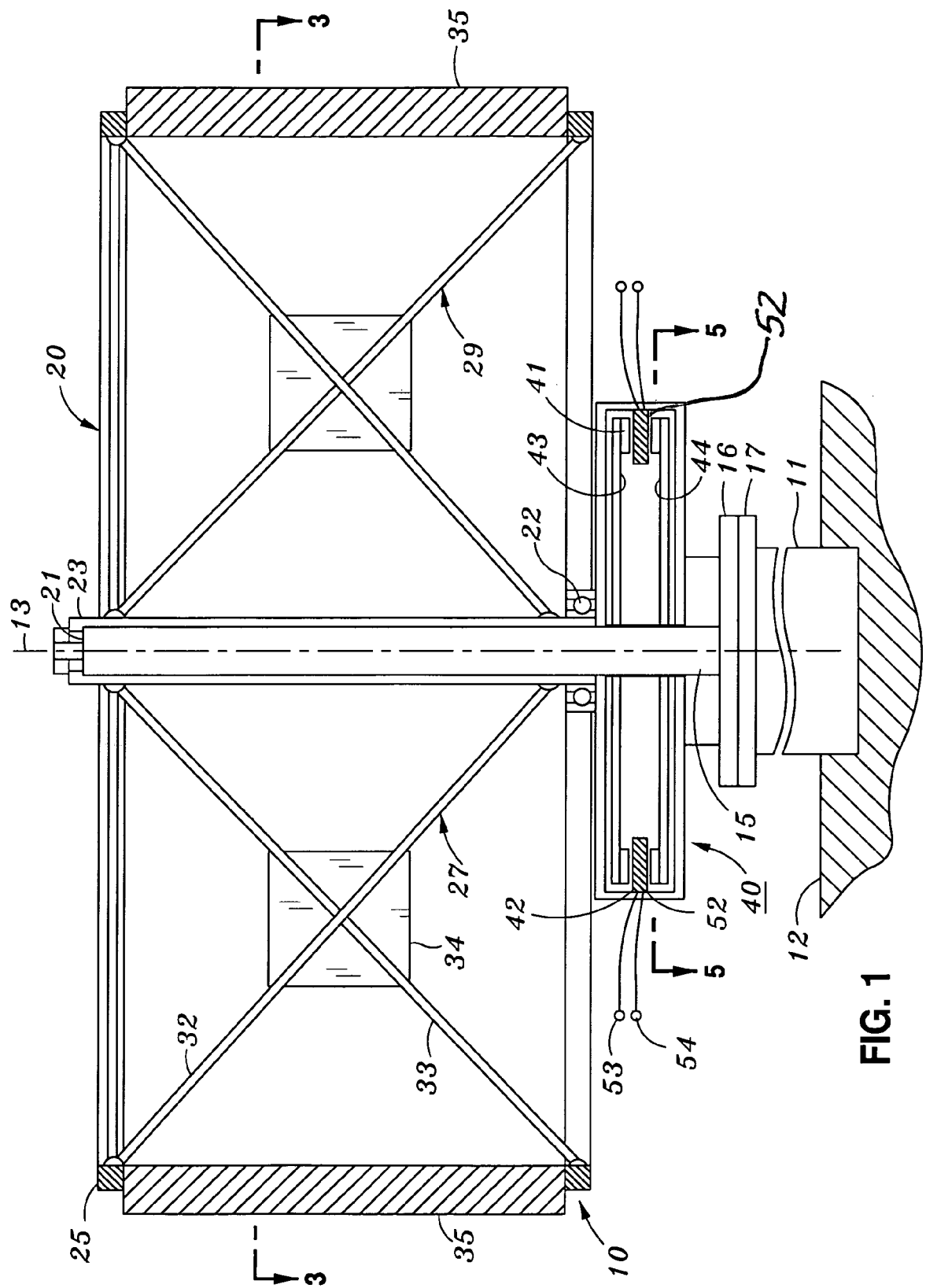
FIG. 1 is a side view partly in cross-section and partly in schematic rotation showing the presently preferred embodiment of the invention.
Figure 3:
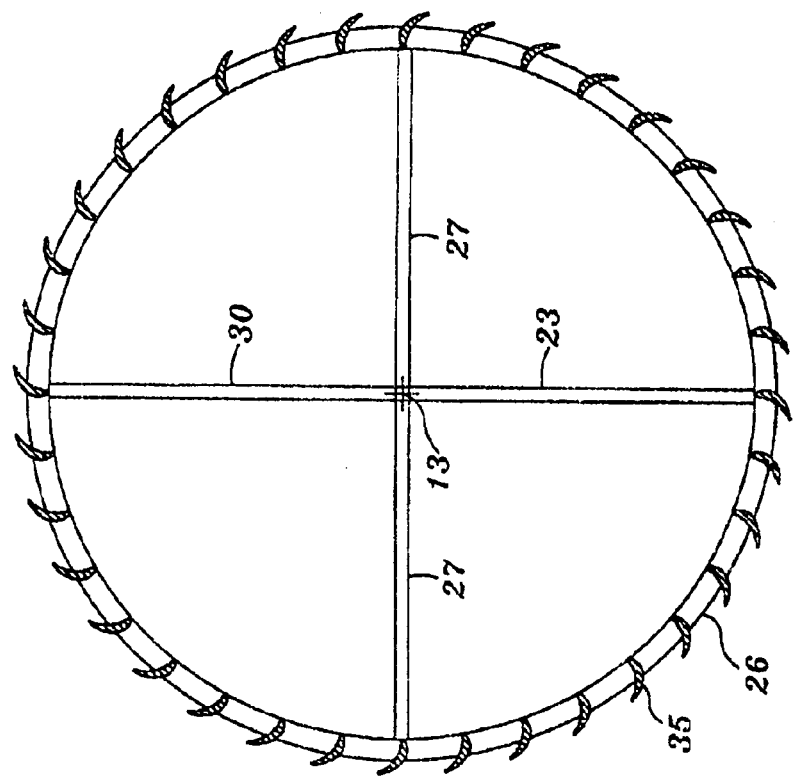
FIG. 3 is a cross-section taken at line 3—3 in FIG. 1.
Figure 2:
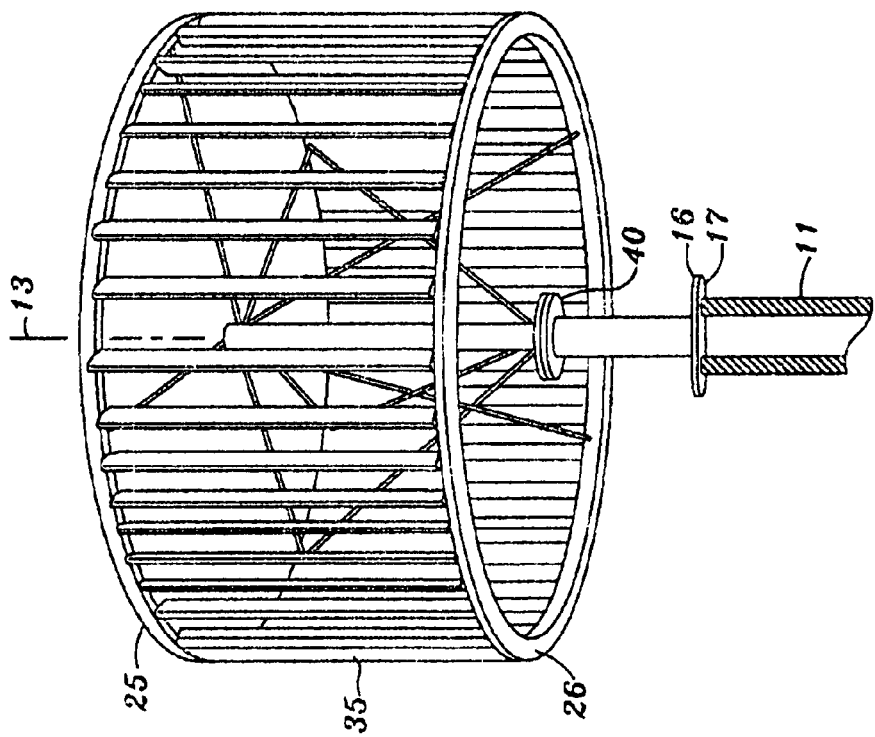
FIG. 2 is an oblique view of the device of FIG. 1.

The system 10 of this invention is mounted to fixed structure 11 such as a heavy-walled tube set in a foundation 12. The system has a central axis 13 which is nominally upright. It may be inclined for best advantage, but this will be a rare occurrence.

A spindle 15 is fixed to structure 11, such as by bolted or welded flanges 16, 17. It does not rotate. A wind turbine rotor 20 is rotatably mounted to the spindle by bearings 21, 22. The wind turbine rotor includes a rotary tubular shaft 23 that is supported in compression by the bearings.

An upper ring 25 and a lower ring 26 are supported on shaft tube 25 by sets of spokes 27, 28, 29, 30 shown as four in number, although they may be more or fewer as required. The rings and spokes are rigid structures.

Spoke 27 is shown in detail as an example. It comprises a pair of diagonal rods 32, 33 extending from one or the other of the rings to the rotary shaft. Gusset plate 34 rigidly joins them at their intersection so the spokes support both rings from the rotor.

A plurality of vanes 35 are connected to and extend axially between the rings. These vanes may be made as strong as desired, but lightness of weight is a virtue, so that the stability of the rings is of greater importance than the compressive strength of the vanes. The driving force for this turbine rotor is the interaction of the vanes with an air stream, so the vanes are strongly fixed to the rings. The angular orientation of the vanes around their own axis relative to the ring is the same for all of the vanes.

An electric generator 40 is supported by the foundation. It preferably is a pancake-type generator of the permanent magnet type. It includes a generator rotor 41 that is fixed to and rotated by rotating tubular shaft 23, and thereby by the wind turbine rotor. The generator rotor sandwiches a one piece stator 42 that is fixed to the foundation. The stator does not rotate.

As best shown in FIG. 1, the rotor has two parallel plate-like rotor portions 43, 44. These are spaced apart from one another. The stator 42 fits between rotor portions 43 and 44, so that the rotor portions rotate relative to the stator. Importantly, the axis of the generator is coaxial with that of the wind turbine, and the wind turbine rotor and the generator rotor are directly structurally connected for mutual rotation. There is no gear system or other control between them.

Although excited field generators can be used, this invention, especially for smaller installations, preferably utilizes fixed permanent magnets, such as magnets 50 in rotor portions 43 and 44. These magnets are preferably plate-like, with their polarities properly aligned. Coils 52 (sometimes called "windings") mounted to the stator are passed by through the magnetic fields and generate the desired output current, which will be approximately proportional to the rotational speed of the turbine.

The coils are completely conventional, and lie in a plane normal to the central axis. The polarities of the magnets are properly positioned to create the desired fields. The number of sets of magnets and of coils is arbitrary and selected in view of the generator dimensions. Leads 53, 54 from each coil extend to a user system (not shown) of any desired type such as batteries or other accumulators.

Here it will be observed that this system is entirely symmetrical and is devoid of any gearing, braking, or feathering mechanisms. Except for the small whirring noise of its bearings it is nearly soundless.

Figure 4:
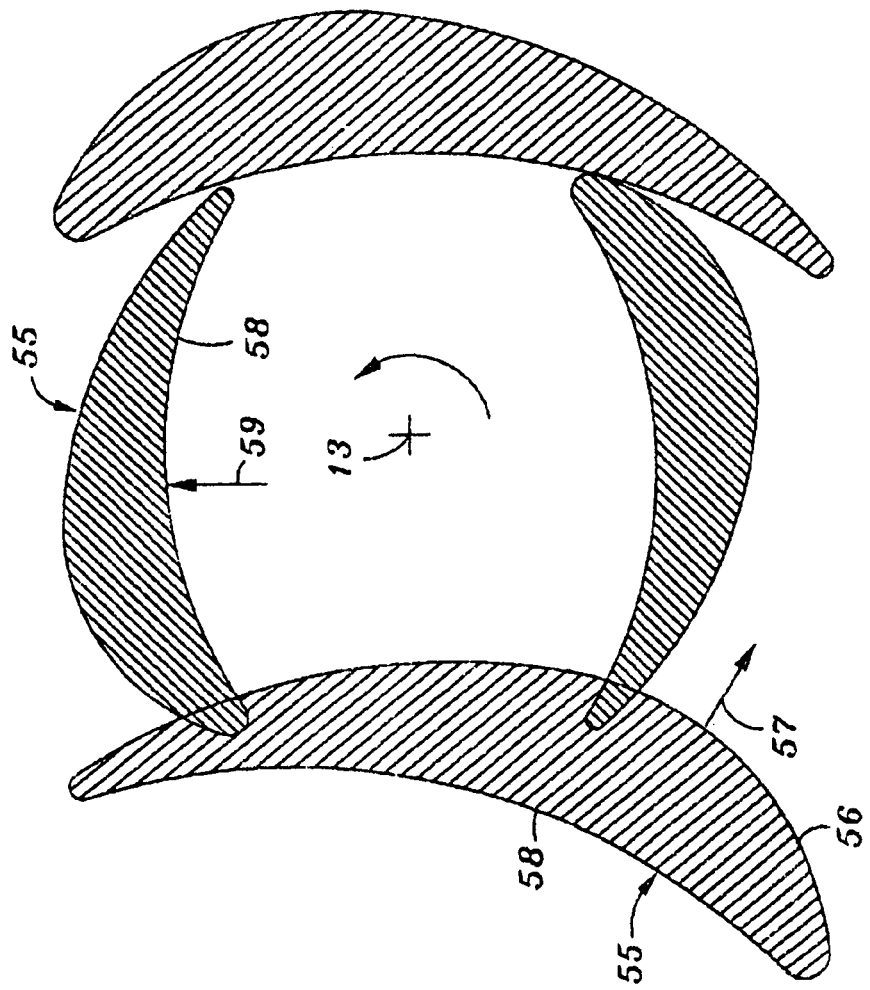
FIG. 4 is a schematic showing of the rotational progression of a vane.

The vanes themselves behave counter-intuitively. As best shown in FIG. 4, a vane 55 representative of all of the vanes has a peculiar cross section. This is because in some attitudes relative to an oncoming air stream, a first one of its faces 56 confronts the wind stream and behaves as an airfoil to generate a "lifting" force 57 lateral to the wind stream, while after the vane rotates sufficiently with the rings, its second face 58 faces toward the air stream, which presses against it. In this position, the shape of its "other" face 58 acts as a baffle to exert a resistive force 59. Importantly, the lifting force 57 and the resistive force 59 when facing the same air stream exert a torque on the rotor in the same rotational sense. They are on the opposite side of the axis, as viewed by the wind stream. They do not cancel each other out.

The cross section shape of the vanes is arbitrary and can be made with a variety of shapes. The example given herein derives most of its net "lifting" force 57 as the vane moves through about a 30 degree arc relative to a nominal attack axis of the wind. It will be recognized that there is always this relationship, regardless of the direction of the wind relative to the structure. Every vane goes through the same arc. The lifting force from the air largely is developed by vanes while they are within this range.

The vanes will be shaped by the user to fit the installation. Their first face 57 (the one which faces the air stream as it moves toward it) would ordinarily be considered a baffle, which in some of its positions it can be, or in others it merely "spills" the stream past it. In the most useful angular positions, it is a convex airfoil construction of any suitable configuration which because of its Bernoulian or Coanda effect, results in a negative, lifting force 57 on the turbine rotor. In this example, it is a counter-rotative torque. This is counter-intuitive to what one would expect from a surface that confronts a wind stream.

The vanes are set at an angle relative to their respective radius such that the vanes are properly aligned to exert the most effective force on the ring within its most effective angle of attack. This will be determined by experimentation. It is fixed, and the same for all of the vanes.

Its second surface 58, which is shielded from the wind stream while on one side of the axis, faces the wind stream when the vane is on the other side. Now the lift on the first face 56 disappears, and the second face confronts the stream and creates another counter-rotative force, which is resistive to the wind stream.

On this side, the configuration of the second face is of less criticality. Still it is best for this surface to capture as much of the impulse force of the wind as possible. For this reason, the second face 58 is preferably concavely curved, rather than flat, so as to entrap a larger mass of air than would be simply be diverted by a planar baffle.

Cross-section dimensions of a suitable vane are as follows.

Dimensions are in inches:
Straight line chord from tip to tip: 8.95
Surface 56: convex
Radius of leading portion (about 45): 3.80
Radius of trailing portion: 8.47
These portions merging tangentially.
Surface 58: concave
Radius: 7.75
Radius of leading edge: 0.313
Radius of trailing edge: 0.156
Height of surface 56 above the said chord, about 2.90
These dimensions can be scaled to form larger and smaller vane cross-sections.

The length of the vanes is arbitrary, being merely long enough to join to the adjacent rings.

The vanes may be made from reinforced foam, fiber reinforced extrusions, or metal skins as desired. Lightweight plastic foams with a dip coated skin have given good performance.

One of the problems with the aforementioned abandoned projects was the tendency of the towers to blow over in high winds. These were very tall, thin towers. They had a ratio between the rotor (D/H) which was quite small, that is, the height was much greater than the diameter.

First, the wind turbine rotor was tall, and the force of the wind on its large height exerted a strong lever-like force to topple it.

Second, a larger height H relative to the diameter D of the rotor minimized the spatial rigidity of the rotor. There was less gyroscopic resistance to tilting out-of plane motion normal to the axis of rotation.

The proper objective is to provide a structure with as great a moment of inertia as possible. In this example, the rings and vanes are the major rotating mass. Their rotational mass, especially at a larger radius and velocity, develop the spatial rigidity assisting the inherent strength of the supporting pole to resist the tendency of the wind to topple the assembly.

It has been determined that by maintaining the ratio D/H between the diameter D of the rotor and its height H, above a lower limit, and preferably well above it, a wheel-like stability can result.

According to this invention, a ratio of D/H which can be considered as its "aspect ratio" not less than about 2 is best practice. In contrast, prior art efforts tended for this ratio to be a fraction of 1.0, or less, and this led to trouble.

At the present time, the preferred dimensions of a suitable smaller capacity wind turbine utilizes a rotor with a diameter of about 10 feet, with a vane height of about 5 feet (D/H=2). This can readily generate about 10 kilowatts in moderate wind streams. It can readily generate 600 kilowatts.

The number of vanes is arbitrary. For the 10 foot diameter and 5 foot height shown in the drawings, about 35 vanes can be used. For larger and smaller diameter rings, the number of vanes, and the size of the cross-section can be selected. The size of the vanes is also pertinent.

FIG. 4 schematically illustrates the progression of a single vane as it is rotated around the central axis. The exposure of its faces alternates as it progresses from side to side.

Figure 5:
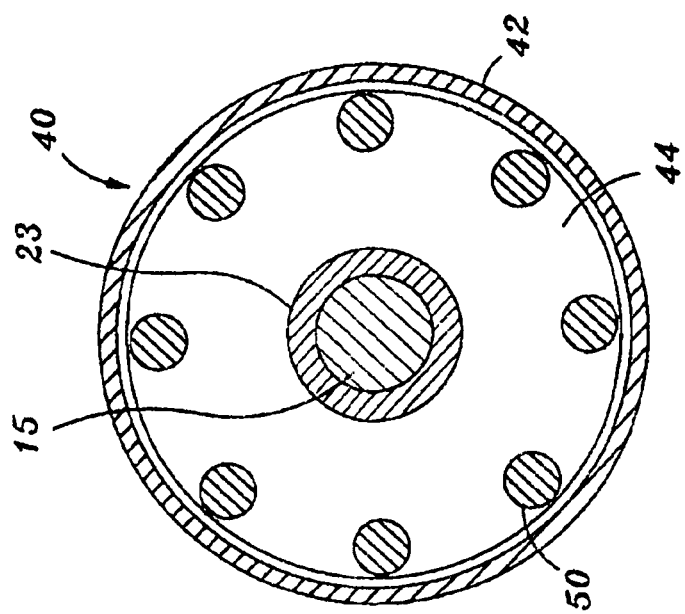
FIG. 5 is a cross-section taken at line 5—5 in FIG. 1.

FIG. 5 illustrates magnets 50 on each rotor plate. These are flat plates provided in pairs with their NS axes aligned and axially directed toward each other. These plates rotate the magnets past the coils so as to cut their fields. Leads 53, 54 from the coils can be connected to any suitable electrical system, such as batteries or user equipment.

Instead of placing the magnets on a flat plane, they may instead be placed on concentric cylinders which rotate together and drawn by the wind rotor. The stator carrying the coils are on a ring between the rotor rings. Either the pancake or ring constructions can be used, but only the pancake type is shown in detail.

Instead of permanent magnets (which are much to be preferred), a suitable generator may utilize stimulated fields instead of permanent magnet fields.

The invention enables the usage of the very efficient vertical wind turbine with improved spatial rigidity and resulting stability. It enables generation of electricity at very low wind speeds and can also accommodate very high wind speeds, all without transmissions, gears, brakes, directional and speed controls. Maintenance is profoundly reduced, and the structure is a good neighbor—silent and effective.

This invention is not to be limited by the embodiment shown in the drawings and described in the description, which is given by way of example and not of limitation, but only in accordance with the scope of the appended claims.

I claim:

1. An electrical generation system driven by the wind, comprising:

supporting structure;

a wind-responsive wind rotor having a vertical axis of rotation;

a shaft driven by said wind rotor and;

an electrical generator comprising a generator rotor and a generator stator, said generator stator being fixed relative to said structure, said generator rotor being attached to and driven by said shaft and having an axis of rotation, said wind-responsive wind rotor, said shaft, and said generator rotor being coaxial and directly connected to one another;

said wind rotor comprising a plurality of vanes mounted to rings concentric with and attached to said shaft, said vanes being so proportioned and arranged that, when facing the wind, a first one of their faces generates a "lifting" force, exerted a torque on one side of the ring through at least a portion of its path around the axis, and a second face which acts as a baffle to exert a torque force on the ring derived from wind flow from the same direction, both forces being exerted in the same rotational sense on the rotor, wherein the ratio D/H of the diameter D of the wind rotor to its height H is not less than 2;

said generator rotor comprising two plates, each carrying a plurality of permanent magnets, and said generator stator carrying a plurality of conductive windings, said generator stator being sandwiched between said two generator rotor plates to generate electrical current when the generator rotor is rotated, said plates being flat or ring shaped;

and said current is provided to a user system by leads from said windings.

2. An electrical generation system according to claim 1 in which said vanes are identical, said first face being convexly curved to exert an aerodynamic force effect, and the second face being convex to impede air flow, both to develop a torque force.

* * * * *